Figure 1:
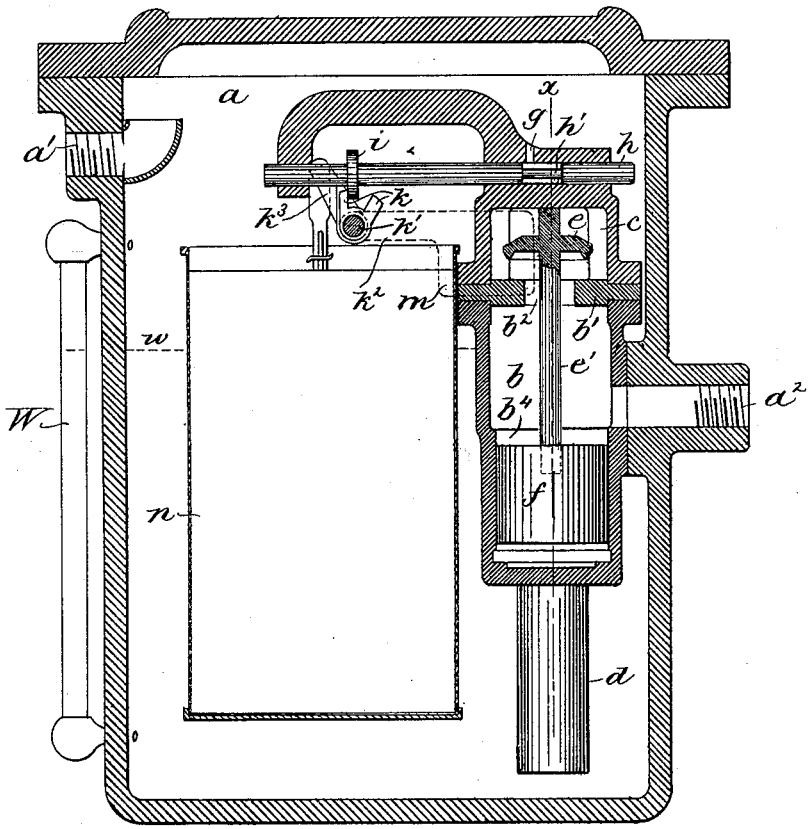

(No Model.)

W. B. MASON.
STEAM TRAP.

No. 338,854. Patented Mar. 30, 1886.

Witnesses,
Jas. J. Maloney.
H. P. Bates.

Inventor,
William B. Mason,
by Jos. P. Livermore
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

STEAM-TRAP.

SPECIFICATION forming part of Letters Patent No. 338,854, dated March 30, 1886.

Application filed February 3, 1886. Serial No. 190,739. (No model.)

*To all whom it may concern:*

Be it known that I, WILLIAM B. MASON, of Boston, county of Suffolk, State of Massachusetts, have invented an Improvement in Steam-Traps, of which the following description, in connection with the accompanying drawings, is a specification, like letters on the drawings representing like parts.

My invention relates to a steam trap or apparatus for discharging water of condensation from steam pipes or apparatus without permitting the escape of steam.

The invention is embodied in an apparatus comprising a reservoir or receptacle for water of condensation having an inlet near its upper part to be connected with the steam-pipes from which water is to be discharged, and having an outlet and valve controlling the same contained within the said receptacle. The mouth or inlet end of the outlet-passage is near the lower end of the receptacle, so that steam entering the upper portion thereof can displace nearly the whole liquid contents of the reservoir before the said mouth is uncovered to permit the steam itself to escape, and the said passage is controlled by a valve connected with an actuating-piston working in a cylinder or chamber within the reservoir, preferably above the water-line. The said piston is connected with the valve, which is so arranged that it seats downward by the action of gravity on the connected valve and piston, and when seated is exposed to the pressure of the fluid in the trap, which tends to keep it seated or to resist a force tending to unseat it, and the piston is of larger area than the valve, preferably about double the area, so that when the fluid in the trap is admitted to the cylinder and acts on the piston in the direction to unseat the valve the total force exerted on the piston tending to unseat the valve is about double that on the valve tending to keep it seated, and the valve is consequently opened and retained so until the pressure is removed from the actuating-piston. The said cylinder is provided with an inlet-port, through which the fluid under pressure may be admitted to act on the piston, and thus overbalance that on the valve, the said inlet-port being controlled by a valve called for distinction the "controlling-valve," which is itself operated in accordance with the rise and fall of liquid in the reservoir. The said controlling-valve is connected with a lever having one arm provided with a weight tending to move it in the direction to open the valve, and its other arm is connected with a variable weight (shown as a bucket) properly located to receive the water of condensation as it enters the reservoir. The weight of the said bucket when full of liquid is sufficient to overcome the other weight connected with the lever and move the latter in the direction to close the controlling-valve, which is its normal condition, when the reservoir is empty and the bucket full, and in the operation of the trap the water flowing into the reservoir overflows the bucket and fills the reservoir around it, so that finally its buoyant effort balances the weight of water in the bucket, when the other weight will prevail and move the controlling-valve so as to admit the steam to act on the piston, and thus cause the main or water valve in the discharge-passage to open and permit the liquid to escape from the reservoir around the bucket, thus leaving the latter unbuoyed, so that it will again prevail over the other weight and cause the valve to close.

Figure 3:
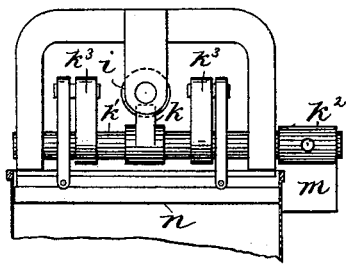
Figure 2:
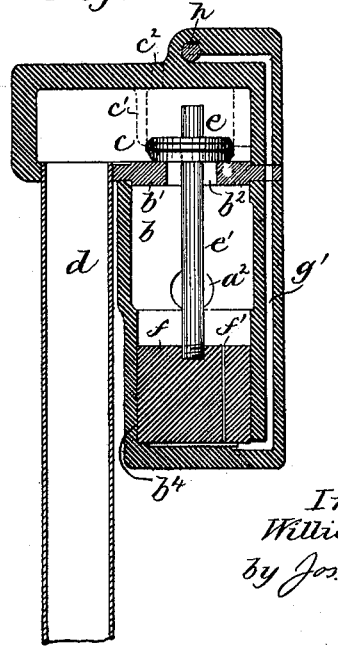

Figure 1 shows in vertical longitudinal section a steam-trap embodying this invention, the parts being shown in the position occupied when the valve is open and the trap discharging water; Fig. 2, a sectional detail on line $x$ $x$, Fig. 1, but with the valves closed; and Fig. 3, a detail showing the devices for actuating the secondary valve in end elevation.

The trap consists of a reservoir, $a$, having an inlet-passage, $a'$, to be connected with the steam-pipes from which water of condensation is to be discharged, and an outlet-passage, $a^2$, communicating with an internal chamber, $b$, shown as made in a separate piece, and attached to the inner surface of the reservoir $a$. The said chamber $b$ is surmounted by a partition, $b'$, and valve-chamber $c$ above it, communicating with a pipe or passage, $d$, extending nearly to the bottom of the reservoir $a$, as shown in Fig. 1. The partition $b'$ is provided with an opening, $b^2$, and its upper surface constitutes a valve-seat for the main or liquid controlling valve $e$, which is connected by a stem, $e'$, with the valve-actuating piston $f$, working in the cylinder $b^4$, formed in the lower part of the chamber $b$, below the outlet-passage $a^2$. The valve $e$ thus controls the discharge of fluid through the pipe $d$ (which has its mouth or inlet end close to the bottom of the reservoir $a$) and the outlet or discharge passage $a^2$, and normally remains seated by the action of gravity upon it and the connected piston $f$.

When the trap is in operation, the upper surface of the valve $e$ is also acted upon by the pressure of the fluid in the trap transmitted through the pipe $d$ into the chamber $c$, which acts positively to retain the valve seated until overcome by a stronger positive upward force, or when there is no material pressure upon the lower end of the actuating-piston $f$. The said piston $f$ has a loose fit in its cylinder, or is provided with a passage, $f'$, which is of small size, and which, when no fluid is admitted to the said cylinder below the piston, relieves the pressure therein, so that the downward pressure on the valve $e$ is unbalanced and the said valve positively retained closed thereby. The said cylinder $b^4$ is provided with an inlet-port, $g g'$, communicating with the upper portion of the reservoir, and controlled by the controlling-valve $h$, (shown as a sliding rod,) which works in a passage crossed by the port $g g'$, and is provided with a groove, $h'$, which, when the said rod is in the position shown in Fig. 1, makes connection between the parts $g g'$ of the port and admits steam therethrough to the cylinder $b^4$, below the piston $f$, and as the said inlet-port is much larger than the exhaust-port $f'$ the latter does not materially reduce the pressure in the cylinder, so that when the valve $h$ is open, as shown in Fig. 1, the pressure will be admitted to act on the piston $f'$ substantially equal per unit of area to that on the valve $e$, and, owing to the greater area of the former, will move the rod $e'$ and connected valve $e$ to the position shown in Fig. 1, opening the passage $b^2$ and permitting the liquid to be discharged from the trap by the full pressure of the steam or fluid entering the inlet $a'$. When the valve $h$ is moved in the direction of the arrow, Fig. 1, its ungrooved portion fills the passage between the two parts of the port $g g'$, stopping the flow of fluid through or closing the said port, so that the fluid is no longer admitted to the cylinder $b^4$, and the fluid in the said cylinder exhausts quickly through the passage $f'$, permitting the piston and valve to move downward both by its weight and by the pressure on the upper surface of the valve, which is practically unbalanced, owing to the fact that the area of escape through the passage $b^2$ from the valve-chamber is much less than that of the inlet $d$ to the valve-chamber, so that the downward movement or seating of the valve is prompt, positive, and certain.

In order to open and close the controlling-valve $h$, in accordance with the rise and fall of the liquid in the reservoir $a$, the said valve is provided with a collar or projection, $i$, acted upon by projections $k$ upon a rock-shaft, $k'$, having an arm, $k^2$, provided with a weight, $m$, and arms $k^3$, connected with a bucket, $n$, arranged to receive the liquid flowing into the reservoir $a$. The arms $k^2 k^3$ practically constitute an elbow-lever, of which the rock-shaft is the pivot or fulcrum, and the weight $m$ is more than sufficient to overbalance the weight of the empty bucket $n$, but is insufficient to balance the weight of the said bucket when full of water even when the latter is acting at the disadvantage of having its line of action nearer the fulcrum of the said lever than that of the said weight $m$, as is the case when the bucket is in its highest position, as will be readily understood from Fig. 1 of the drawings, in which the weight is shown in dotted lines.

In operation, the bucket is filled with liquid in first setting the trap in operation, and always remains full of liquid, as there is no tendency for liquid to escape from it, except by overflowing. When thus filled with liquid, the bucket overbalances the weight $m$ and closes the controlling-valve $h$, so that when the trap is under pressure the said pressure acting unbalanced on the valve $e$ will positively retain the said valve closed and prevent escape of fluid from the trap. Then, as the water of condensation accumulates it overflows the bucket $n$ and rises around it, acting upon the said bucket by its buoyant effort, so that when it has risen to the top of the bucket it completely balances the weight of the liquid contained in the bucket, so that the weight $m$, opposed only by the weight of the empty bucket, prevails and moves the valve $h$ to the position shown in Fig. 1, admitting steam to the cylinder $b^4$, below the piston $f$, causing the valve $e$ to open, so that the liquid is forced out from the reservoir by the pressure of the steam entering the inlet $a'$. The arms $k k'$ of the lever are so arranged that whichever weight is lowest acts with the greatest advantage or at the greatest distance from the fulcrum, and consequently when in the position shown in the drawings, the weight $m$ will nearly balance the full bucket $n$, and will consequently sustain its weight until the water is nearly all forced out from the trap and its buoyant effect thus removed from the bucket; but before the water has been wholly excluded the weight of the bucket, with its contents, being no longer buoyed, becomes sufficient to overcome the weight $m$, and closes the valve $h$, causing the valve $e$ to be closed, and in this movement the bucket $n$ is brought at a greater distance from the fulcrum and the weight $m$ nearer than when in the position shown in the drawings, so that the bucket will overbalance the weight until the water has risen around it nearly to the top of the bucket, as indicated by the dotted line $w$. The distance between the actuating projections $k$ for the controlling-valve is greater than the thickness of the flange $i$, engaged by them, so that either the variable weight of the bucket or the invariable weight $m$, acting on the rock-shaft, acquires momentum, and has its leverage increased with relation to that of the other weight before it is called upon to do the work of moving the secondary valve in either direction.

By the employment of a bucket or receptacle as a variable weight the proper adjustment of the weights can be easily effected, and there is a large margin or difference in the variable weight, affording certain and positive operation and avoiding the numerous objections that arise when a float is employed—such as danger of leakage or collapse of the float when the pressure in the trap is considerable.

The movement of the valve *e* is positive and prompt both in opening and closing, and the trap is certain in operation.

The trap is shown as provided with a water-gage, W, by which the rise and fall of the water in the operation of the trap may be observed. The valve *e*, having its upper surface acted upon by the pressure of the fluid in the trap, together with the piston *f*, of larger area, acted upon at times by a fluid-pressure of the same amount per unit of area, constitute practically a differential piston, and if preferred the said valve *e* may be made as a piston working in a cylinder, *c'*, in the upper part of the valve-chamber, as shown in dotted lines, Fig. 2, which cylinder communicates with the interior of the reservoir *a* through a port, $c^2$, thus insuring that the downward pressure on the valve is always the same as that in the reservoir, and substantially the same per unit of area as that acting on the larger piston, *f*, when the controlling-valve *h* is open.

I claim—

1. A steam-trap comprising a reservoir having an inlet-opening and an outlet-passage with its mouth or inlet end near the lower end of the trap, combined with a main valve controlling said outlet-passage, an actuating-piston connected with said valve and cylinder therefor, having an inlet-port communicating with the reservoir and an exhaust-passage, and the controlling-valve governing said inlet-port operated in accordance with the rise and fall of the liquid in the reservoir, substantially as described.

2. In a steam-trap, the combination of the reservoir for the condensed liquid, provided with inlet and outlet passages, with a valve controlling the outlet-passage, and the actuating-piston therefor, and a controlling-valve governing the admission of fluid to act on said piston, and variable and invariable weights actuating the said controlling-valve, tending to move it in opposite directions, substantially as described.

3. The combination of the reservoir having inlet and outlet passages, with a valve controlling the latter, an actuating-piston connected with the said valve working in a cylinder provided with an inlet-passage, a controlling-valve for said passage, an elbow-lever for actuating said valve, a bucket arranged to receive the liquid flowing into the reservoir and acting by its weight to move the lever and controlling-valve in one direction, its weight being variable, owing to the rise and fall and buoyant effect of the liquid in the reservoir outside the bucket, and a weight acting to move the lever and arm in the other direction, the weight and bucket each having greater leverage to resist the movement produced by the other than to cause the movement of the other, substantially as and for the purpose described.

In testimony whereof I have signed my name to this specification in the presence of two subscribing witnesses.

WM. B. MASON.

Witnesses:
JOS. P. LIVERMORE,
H. P. BATES.